United States Patent
Fluhler et al.

(10) Patent No.: US 10,168,420 B1
(45) Date of Patent: Jan. 1, 2019

(54) NONLINEAR INTERFEROMETRIC IMAGING SENSOR

(71) Applicants: Herbert U. Fluhler, Huntsville, AL (US); Michael J. Guthrie, Huntsville, AL (US)

(72) Inventors: Herbert U. Fluhler, Huntsville, AL (US); Michael J. Guthrie, Huntsville, AL (US)

(*) Notice: Subject to any disclaimer, the term of this patent is extended or adjusted under 35 U.S.C. 154(b) by 580 days.

(21) Appl. No.: 14/800,669

(22) Filed: Jul. 15, 2015

Related U.S. Application Data

(60) Provisional application No. 62/024,725, filed on Jul. 15, 2014.

(51) Int. Cl.
| | |
|---|---|
| *G01S 7/41* | (2006.01) |
| *G01S 13/52* | (2006.01) |
| *G01S 13/90* | (2006.01) |
| *G01S 13/536* | (2006.01) |
| *F41H 11/02* | (2006.01) |

(52) U.S. Cl.
CPC .............. *G01S 7/414* (2013.01); *G01S 13/52* (2013.01); *G01S 13/536* (2013.01); *G01S 13/9023* (2013.01); *F41H 11/02* (2013.01)

(58) Field of Classification Search
CPC .......... G01S 7/414; G01S 13/32; G01S 13/50; G01S 13/52; G01S 13/536; G01S 13/87; G01S 13/878; G01S 13/9023; G01S 13/9029; F41G 7/008; F41G 7/224; F41G 7/2246; F41G 7/2253; F41G 7/226; F41G 7/2286; F41G 7/2293; F41H 11/02
See application file for complete search history.

(56) References Cited

U.S. PATENT DOCUMENTS

| | | | | |
|---|---|---|---|---|
| 3,242,487 A | * | 3/1966 | Hammack | G01S 13/66 324/130 |
| 3,286,263 A | * | 11/1966 | Hammack | G01S 1/02 342/126 |
| 3,706,096 A | * | 12/1972 | Hammack | G01S 1/302 342/103 |
| 4,540,140 A | * | 9/1985 | Levy | F41G 7/2253 244/3.19 |

(Continued)

*Primary Examiner* — Peter M Bythrow
(74) *Attorney, Agent, or Firm* — Patent Grove LLC; Tomas Friend

(57) ABSTRACT

A new radar is disclosed possessing desirable attributes for close range, short event time, high data rate sensing and data collection applications. A Continuous Wave (CW) or very high Pulse Repetition Frequency (PRF) Pulse based waveform, nominally with very high duty cycle (i.e. highly range aliased), is amplified and transmitted from one antenna, and after reflection from targets of interest, is received by one or a plurality of receive antennas. Both transmit and receive are optimally synchronous and phase coherent. The received signals are down converted to baseband leaving only the Doppler frequency from the targets of interest. These Doppler frequencies change over Fast Time as a function of the specific target trajectory and speed. A bank of time dependent correlation filters, each tuned to a different trajectory hypothesis, are used to integrate up the Doppler Signal for targets traveling the hypothesized trajectory, and decorrelated those that are not.

9 Claims, 10 Drawing Sheets

(56) References Cited

U.S. PATENT DOCUMENTS

Figure 1:
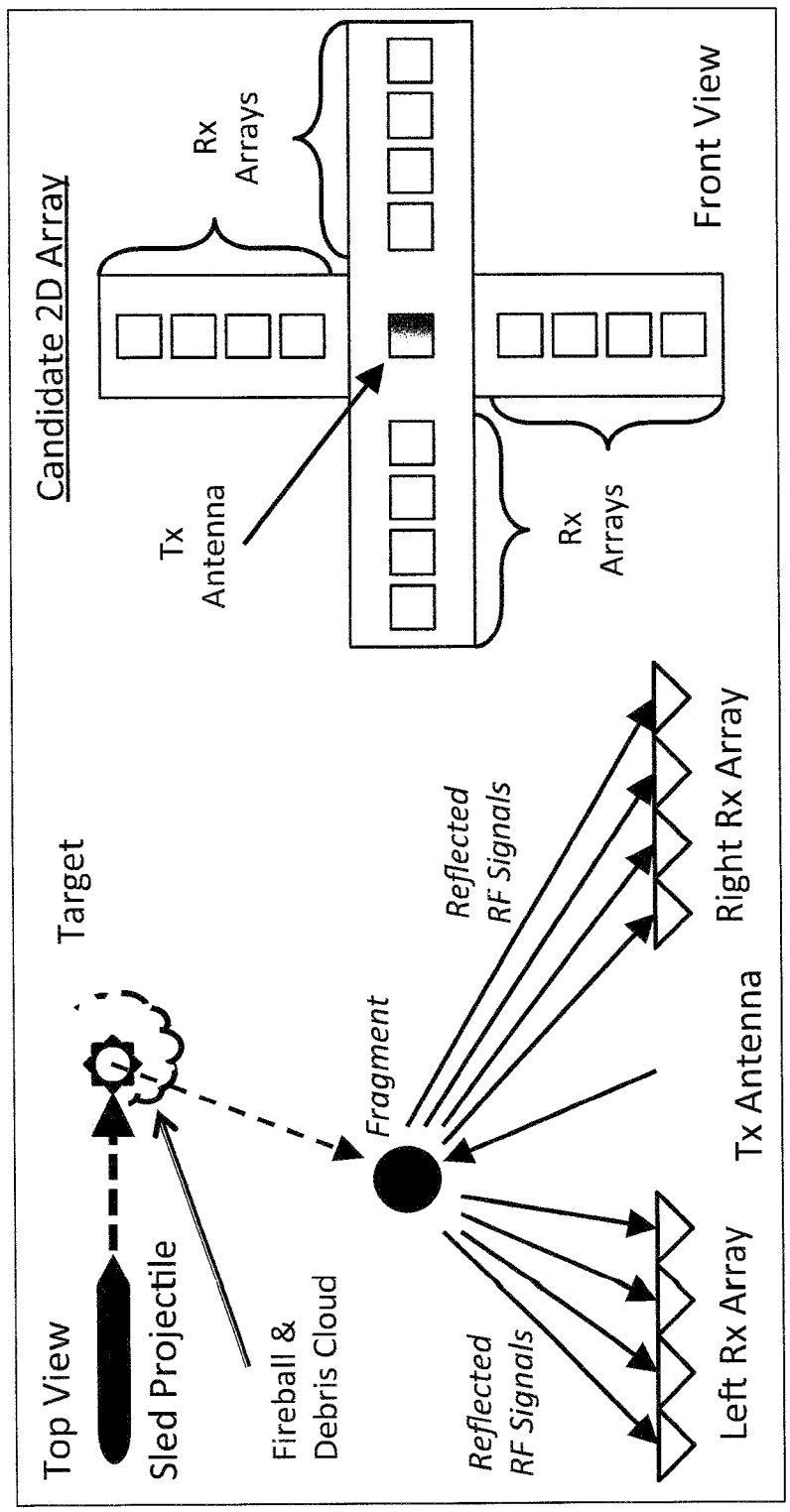

| | | | | |
|---|---|---|---|---|
| 5,192,955 | A * | 3/1993 | Hoang | G01S 13/449 342/149 |
| 5,381,156 | A * | 1/1995 | Bock | G01S 13/72 342/126 |
| 5,525,995 | A * | 6/1996 | Benner | G01S 13/003 342/107 |
| 5,696,347 | A * | 12/1997 | Sebeny, Jr. | F41G 7/2213 102/211 |
| 6,522,295 | B2 * | 2/2003 | Baugh | G01S 5/02 342/453 |
| 6,738,021 | B2 * | 5/2004 | Benner | G01S 13/003 342/378 |
| 6,798,381 | B2 * | 9/2004 | Benner | G01S 13/003 342/451 |
| 6,801,163 | B2 * | 10/2004 | Baugh | G01S 7/023 342/451 |
| 6,995,705 | B2 * | 2/2006 | Bradford | G01S 7/4004 342/175 |
| 7,518,543 | B2 * | 4/2009 | Herberthson | G01S 13/003 342/104 |
| 7,684,020 | B1 * | 3/2010 | Marti | F41G 5/08 356/28 |
| 7,954,411 | B2 * | 6/2011 | Odhner | F41H 5/007 235/400 |
| 8,307,694 | B1 * | 11/2012 | Kiefer | G01S 5/06 73/12.01 |
| 8,316,690 | B1 * | 11/2012 | Kiefer | G01M 7/00 73/12.01 |
| 8,371,202 | B2 * | 2/2013 | Odhner | F41H 11/02 235/400 |
| 8,625,905 | B2 * | 1/2014 | Schmidt | G06K 9/00335 348/142 |
| 9,140,784 | B1 * | 9/2015 | Friesel | G01S 13/581 |
| 2004/0075605 | A1 * | 4/2004 | Bradford | G01S 7/4004 342/95 |
| 2006/0175464 | A1 * | 8/2006 | Chang | F41H 5/007 244/3.19 |
| 2009/0000465 | A1 * | 1/2009 | Deflumere | F41H 11/02 89/1.11 |
| 2009/0308273 | A1 * | 12/2009 | Chirivella | F41G 7/2253 102/377 |
| 2009/0314878 | A1 * | 12/2009 | Raviv | F41F 3/04 244/3.11 |
| 2010/0070238 | A1 * | 3/2010 | Phelps | F41G 3/02 702/181 |
| 2010/0117888 | A1 * | 5/2010 | Simon | F41H 11/02 342/67 |
| 2010/0164784 | A1 * | 7/2010 | Longstaff | G01S 13/003 342/202 |
| 2010/0175573 | A1 * | 7/2010 | Cornett | F41H 11/02 102/201 |
| 2012/0091253 | A1 * | 4/2012 | Patterson | F41F 3/073 244/3.15 |
| 2012/0169524 | A1 * | 7/2012 | Yeary | G01S 5/0273 342/62 |
| 2013/0113647 | A1 * | 5/2013 | Sentelle | G01S 13/32 342/22 |
| 2013/0194128 | A1 * | 8/2013 | Van Der Merwe | G01S 13/582 342/107 |
| 2015/0301167 | A1 * | 10/2015 | Sentelle | A61B 5/0205 342/22 |
| 2018/0113095 | A1 * | 4/2018 | Chaffee | G01N 29/04 |

* cited by examiner

NONLINEAR INTERFEROMETRIC IMAGING SENSOR

CROSS REFERENCE TO RELATED APPLICATION

This application claims the benefit of Applicant's U.S. provisional application No. 62/024,725, filed Jul. 15, 2014, titled "Nonlinear Interferometric Imaging Sensor", which is incorporated herein in its entirety by reference.

STATEMENT REGARDING FEDERALLY FUNDED DEVELOPMENT

Adaptation and application to specific defense related uses was made with government assistance from the Missile Defense Agency under Small Business Innovation Research (SBIR) Topic MDA14-008: "Mapping Debris Trajectories Through a Fireball." Contract Number: HQ0147-15-C-7127. The government has SBIR Data Rights in the invention.

FIELD OF THE INVENTION

The present invention relates to the simultaneous radar detection, tracking and discrimination of a large multitude of small moving targets, generally (but not necessarily) within a short period of time, and generally (but not necessary) within a relatively small sensed three dimensional (3D) volume. Conventional radars are usually ill suited for the conditions described above due to a plethora of reasons such as range and velocity aliasing, insufficient integrated energy for detection, and insufficient time to steer beams and detect, verify, and track a large multitude of targets confined in a small volume at high speed for only a short period of time. The present invention solves these problems with embodiments that employ Continuous Wave (CW) or high duty pulsed waveforms for maximizing energy on target, employing wide field of view antennas that do not require beam steering (steering is done by digital beam forming after the fact), viewing all targets simultaneously to operate over very short time events, and discriminating and tracking individual members of the multiplicity of targets with a novel trajectory dependent correlation Doppler Filter for separation, tracking and enumeration of the multiplicity of targets. The present invention also provides an unprecedented level of Doppler resolution limited only by the bandwidth of the observation time (i.e. 1/Observation Time), which in turn enables a novel means for measuring the mass of ballistic targets, said means derived from combining the measured Radar Cross Section (RCS) of the target(s) and the rate of velocity slow down due to drag (Beta). The new invention therefore provides a unique RF sensor that can detect, track and discriminate high velocity debris through the blinding flash of an explosive or high velocity impact fire ball, and provide both trajectory data and mass on all the fragments ejected from the high energy event, all with inexpensive, and potentially expendable RF sensing hardware. Other embodiments could take the general approach outlined herein to other radar applications where the high computing throughput required to post process the data is amenable or addressable.

BACKGROUND OF THE INVENTION

Understanding the physics and dynamics of explosive ordinance and sled tests, which simulate missile intercepts, requires detailed measurements of fragment trajectories, velocities, sizes, and masses. Warhead characterization tests adhere to the guidelines and procedures described in the Joint Munitions Effectiveness Manual (JMEM) [1]. While witness panels have been used to collect fragment data from arena tests, the resulting data provides only a fraction of the critical data needed for validation of codes, which compute vulnerabilities and weapons lethality. The tracking and characterization of fragments immediately after detonation/intercept and during evolution of the fireball is of vital interest. Given the high temperatures of the fireball surrounding a detonation or intercept event, optical/IR sensor techniques are generally ineffective during these early times of the fireball development and subsequent expansion. In addition to the limits of optical techniques to "see" through the fireball for data collection, "traditional" RF/Radar techniques also fail to capture the required data and information needed due to the required long scan times and low spatial as well as low velocity resolution.

BRIEF SUMMARY OF THE INVENTION

A key objective of this invention is therefore to measure high velocity fragments ejected from a high-energy collision or explosive event that subsequently produces a high temperature fireball that otherwise shrouds the early time evolution of the disassembly.

The new radar of the invention combines Continuous Wave (CW) Radio Frequency (RF) power with algorithms that implement a unique form of Doppler based Interferometric Imaging Radar (hereafter referred to as CWIIR). CWIIR has some similarities to an Inverse Synthetic Aperture (ISAR) array in that it does not track a target over time and space, but rather images it. The CWIIR is also similar to an interferometer in that an array of receivers is used to obtain high-resolution trajectory images. The CWIIR technique generates multiple images from received Doppler In-phase (I) and Quadrature-phase (Q) signals scattered from targets using a unique Nonlinear Pulse Compression (PC) and phasor "unwrapping" technique. Data is collected during a warhead characterization test, and post-test processing of the data from each Nonlinear Doppler filter then generates images of only those objects detected that have the same velocity magnitude (speed) or alternatively velocity (speed and direction). This allows segregation of the trajectories into a significant number of separate images, one for each fragment "speed", and the narrow span of speed/velocity admitted in each of the images is quite narrow, thereby providing high discrimination for each speed/velocity. For example, assuming a maximum expected speed of 6000 meters per second (m/s), and a 50 m/s to 100 m/s velocity resolution would require approximately 60 to 120 separate images; one for each velocity magnitude. If deigned for speed, each of the filter images admits multiple trajectories, but only if they have the same speed; for example, one trajectory for each fragment having that velocity magnitude. This approach acts to significantly reduce the clutter resulting from the large number of fragments ejected into the field-of-view (FOV) of the sensors during a blast event, since only those fragments having the same velocity magnitude are captured in each image. By combining multiple images from different receive antennas located at different geometric positions in space about the imaging volume, 3-dimensional (3-D) trajectories can be constructed from the data out of the velocity magnitude filters. Knowing the strength of the received signal of the target over the path of the trajectory relative to the given receiver antenna also gives an indication of the fragments radar cross-section (RCS), and by suitable range compensation the individual IQ samples for the target can be coherently integrated to provide a good measurement of the RCS. When combined with measurements of the Ballistic Coefficient (Beta) from witnessing of the fragment slow down [4], a reasonable estimate of the fragment mass can be determined.

DETAILED DESCRIPTION OF THE DRAWINGS

FIG. 1 shows the baseline radar consists of a CW transmitter, a transmit antenna, and an array of passive receive antennas that may be disposed in both horizontal and vertical directions. Because the CWIIR uses Radio Frequencies (RF) above the fireball plasma frequency ($\omega p \sim 10$ GHz), this sensor is expected to "see" into the fireball as it expands. Also, as the CWIIR is a CW (or high duty pulsed) radar, it has a high (i.e. 100%) Duty Cycle to maximize energy on target and hence sensitivity for detection of small Radar Cross Section (RCS) debris fragments. CW operation also enables very accurate Doppler frequency shift measurements yielding very accurate velocity determination of the discrete debris constituents. The end result is a set of 3-D "Doppler images" of the fragment trajectories.

Figure 2:
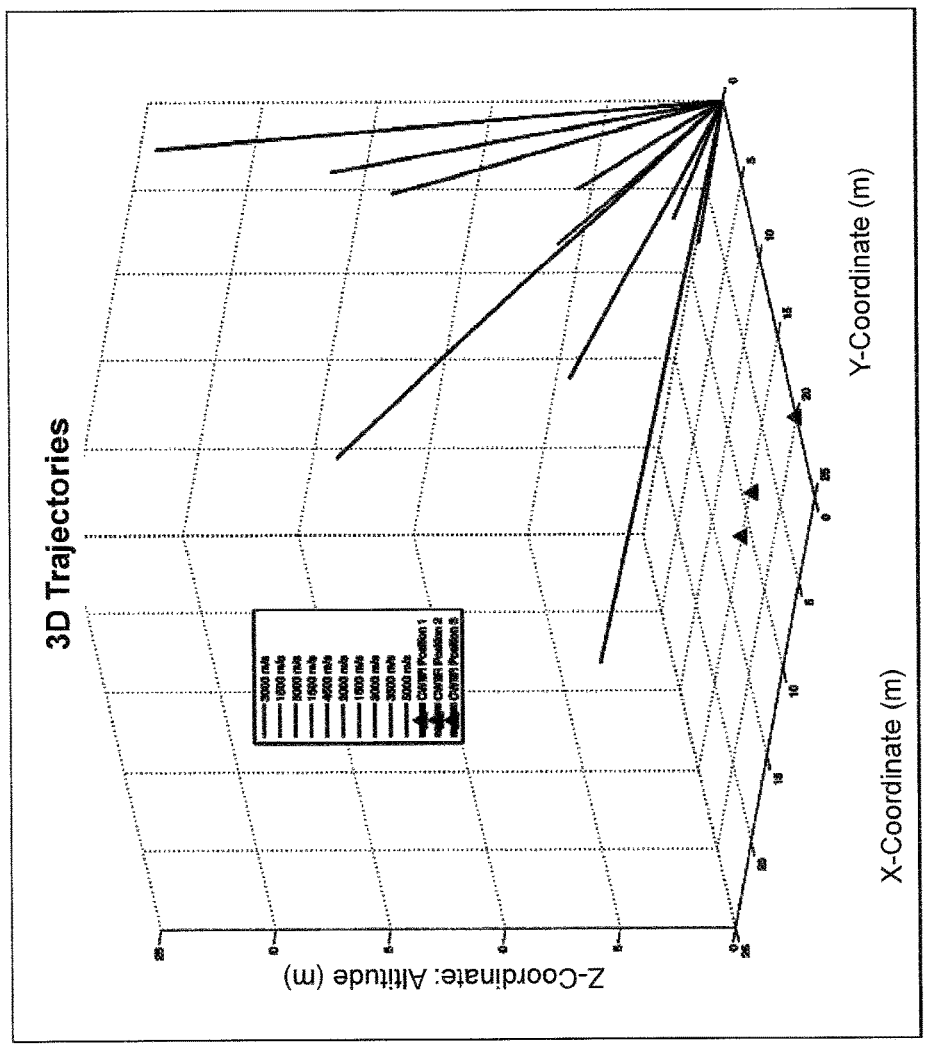

FIG. 2 shows the geometry of the test arena for simulations and the trajectories of ten sample fragments for the first one-hundredth of a second of flight time. Also shown are locations (triangles) for three monostatic sensor locations. The figure uses a right-handed coordinate system where the x-coordinate axes represents "East" at a direction of 0 degrees, where "azimuth" in this coordinate system is measured counter-clockwise to "North" at 90 degrees (the Y-axis).

Figure 3:
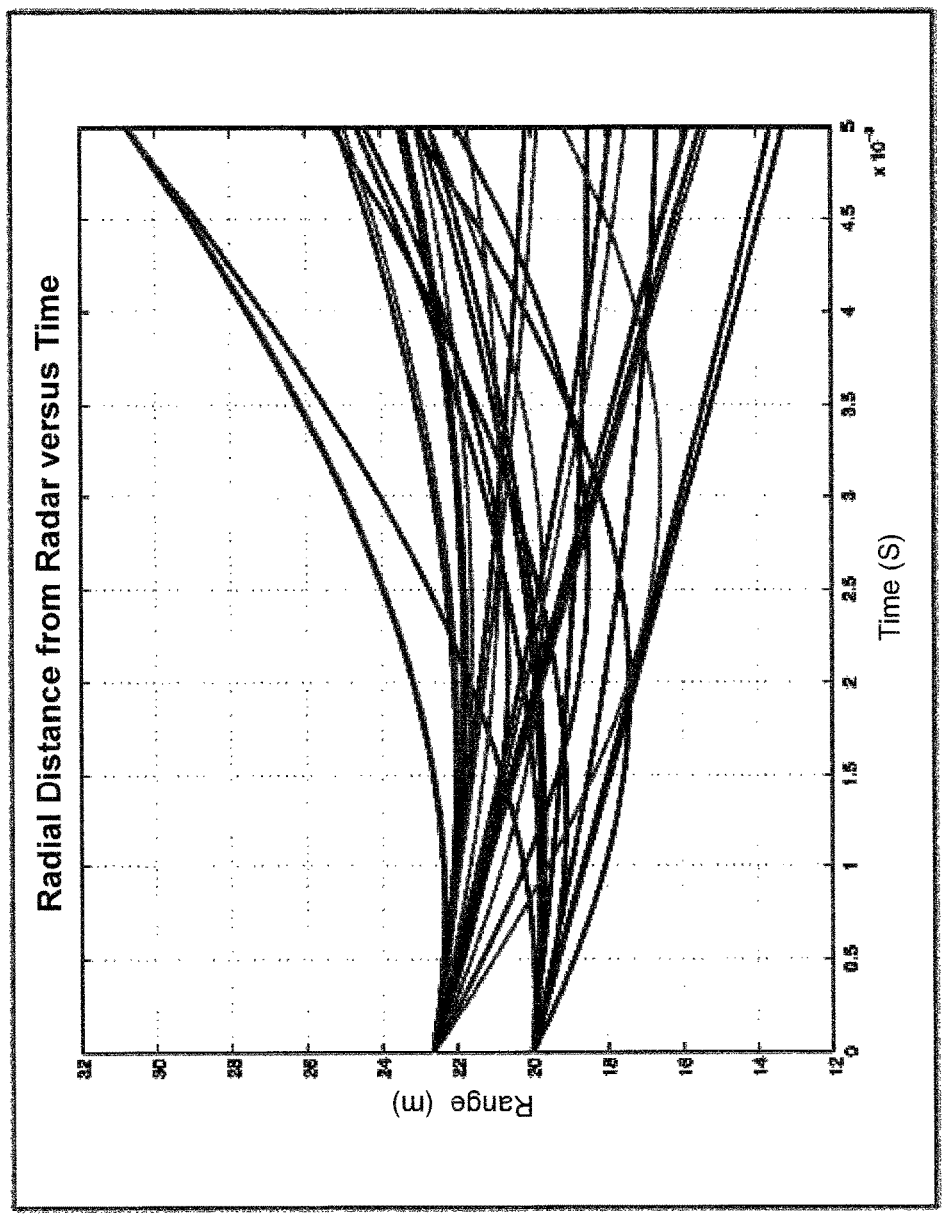

FIG. 3 shows the radial distances of the fragments with respect to each of the CWIIR radars shown in FIG. 2. The distances are seen to vary in a nonlinear manner over time. Likewise, the slope of these lines, which is proportional to the radial velocity, and thence related to the Doppler frequency, is seen to vary in a related but still nonlinear manner.

Figure 4:
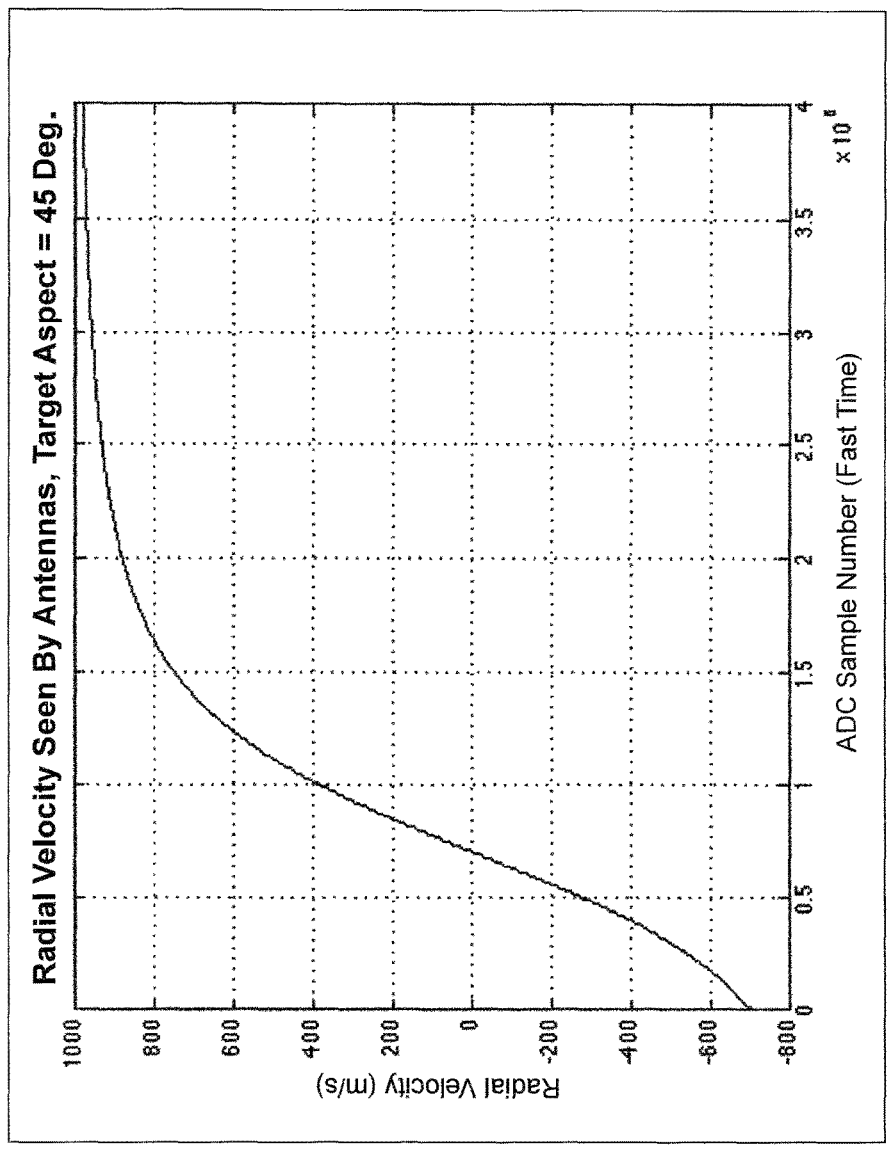

FIG. 4 Shows the radial velocity of just one fragment (from a different set of conditions) to show how varied the observed radial velocity can be. This in turn suggests the time dependent Doppler frequency can be likewise varied and nonlinear. This variation and non-linearity makes each trajectory uniquely discernable via its nonlinear fast time dependent Doppler profile.

Figure 5:
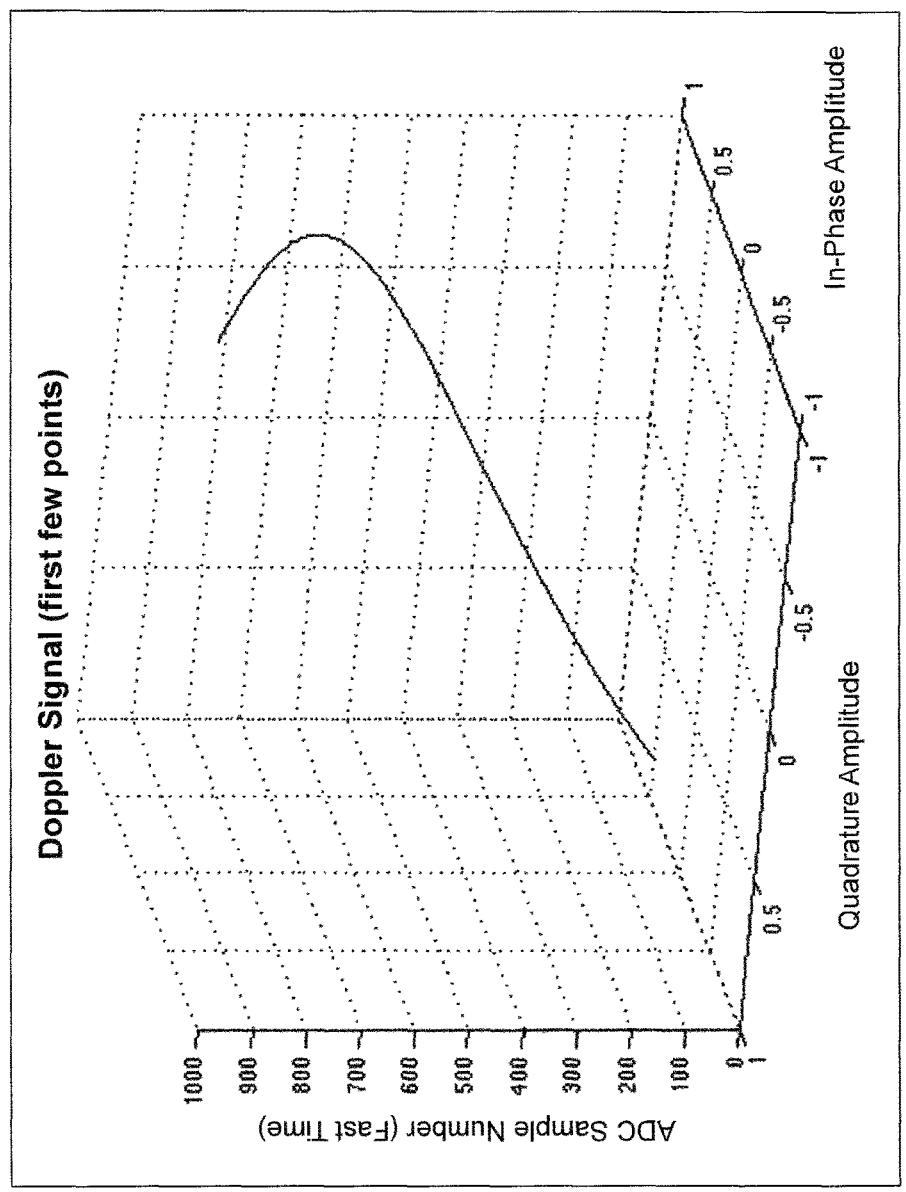

FIG. 5 Shows the actual IQ Doppler signal versus fast time after down conversion showing the helix structure of the signal. This signal is fairly cylindrical, but other trajectories can trace out highly conical or other "vase shaped" patterns. This pattern is the trace of the tip of the Doppler Phasor as it rotates due to Doppler frequency in fast time. To invert this rotation, one simply counter rotates each IQ data sample phasor by an amount that co-aligns them all in the IQ plane, and then they can be coherently added to provide in integrated sum.

Figure 6:
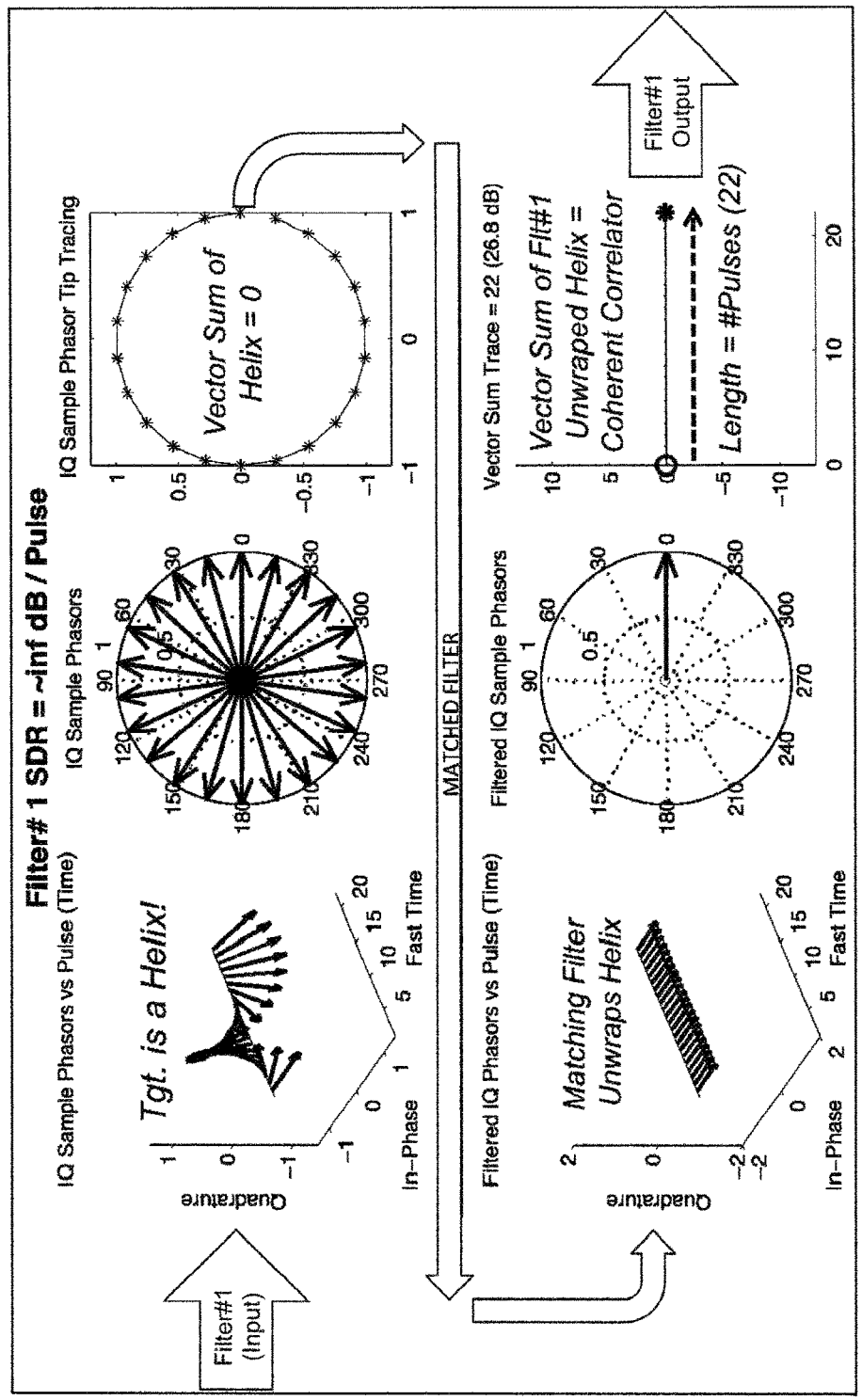

FIG. 6 illustrates visually the operation of a traditional Doppler Filter where the incoming Doppler filter manifests as a helical rotation about the fast time axis, and spreads the IQ samples phasor tips about the unit circle of phase. If these IQ sample phasors are vector added without filtering, they will on average add up to something close to zero which is not a desired outcome. By applying an appropriately designed Doppler Filter, one that inverts the rotation of the IQ sample phasors about the fast time axis, the IQ Phasors can be made to co-align. When these rotated IQ sample phasors are added vectorally, they now add in coherently and in phase, resulting in coherent integration of their signal contributions. The new invention simply replaces the traditional Doppler filter with one designed to "unwrap" the nonlinear Doppler frequency profile of a fragment traveling on a specific trajectory relative to a given receive antenna (or Transmitter and Receiver pair if employed in a Bistatic architecture).

Figure 7:
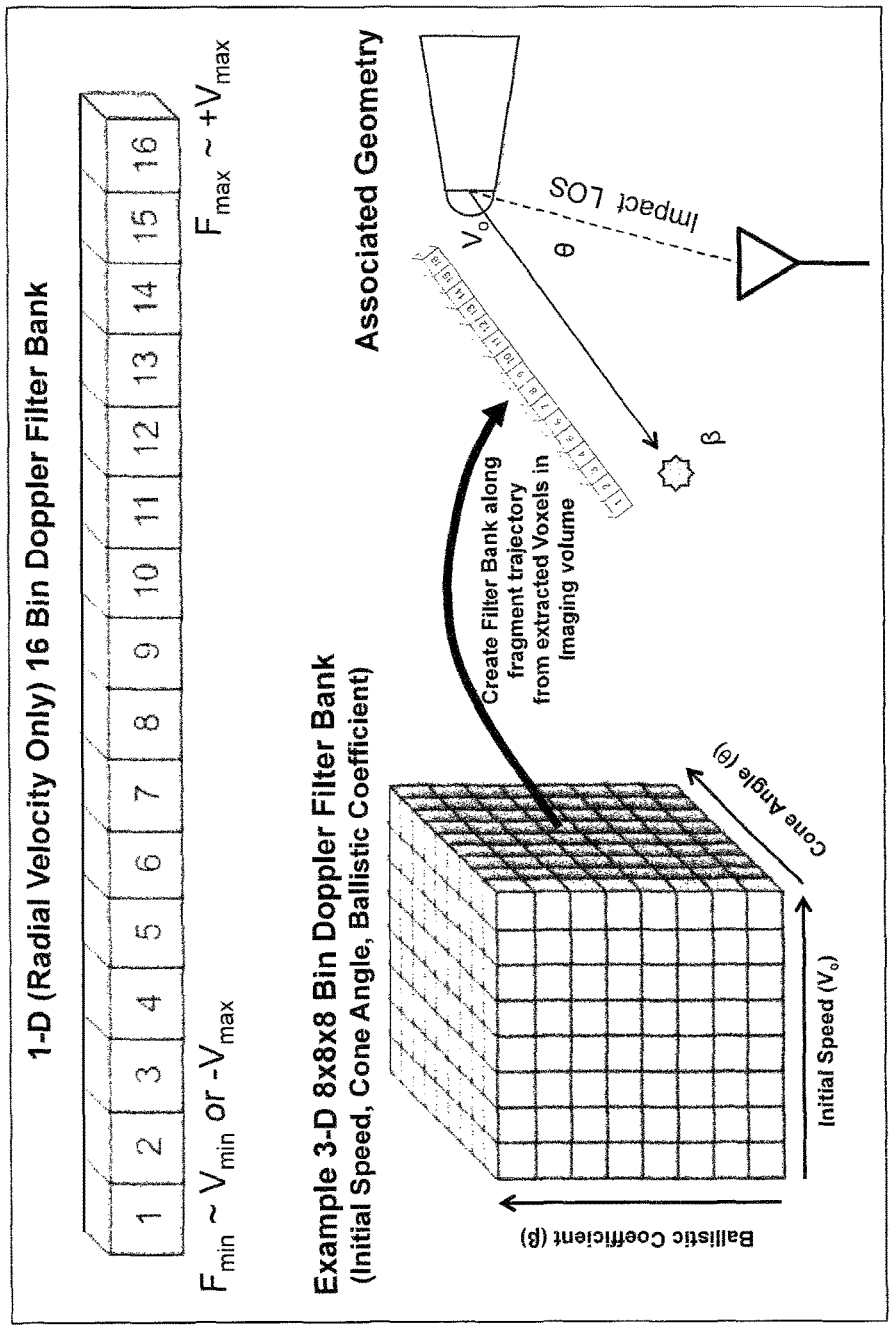

FIG. 7 shows the relation between a traditional Doppler Filter and the imaging volume of the present invention. The 3D volume contains the voxels to be imaged, and fragments will start from one point within this volume and propagate radial from that origin on the impacted body. Essentially the invention projects a Doppler Filter Bank along each hypothesized trajectory, and computes the expected Doppler shift in each Doppler Filter Bin according to the geometry between the target trajectory positions and the CWIIR receive antenna and the time of flight of the target in fast time to each Doppler Filter Bin. The amount of phase accumulates across the filter. Taking the Complex Conjugate of each Doppler Filter Bin Phasor creates the counter rotating phase rotation for that bin: essentially the filter coefficients for that bin as a filter tap. These complex conjugates comprise the Doppler Correlation Filter of the CWIIR for that specific trajectory hypothesis. Other trajectory hypotheses are then created to look for fragments that might be traveling those trajectories. If no fragment is traveling on the hypothesized trajectory, then the corresponding correlation filter response will average zero output.

Figure 8:
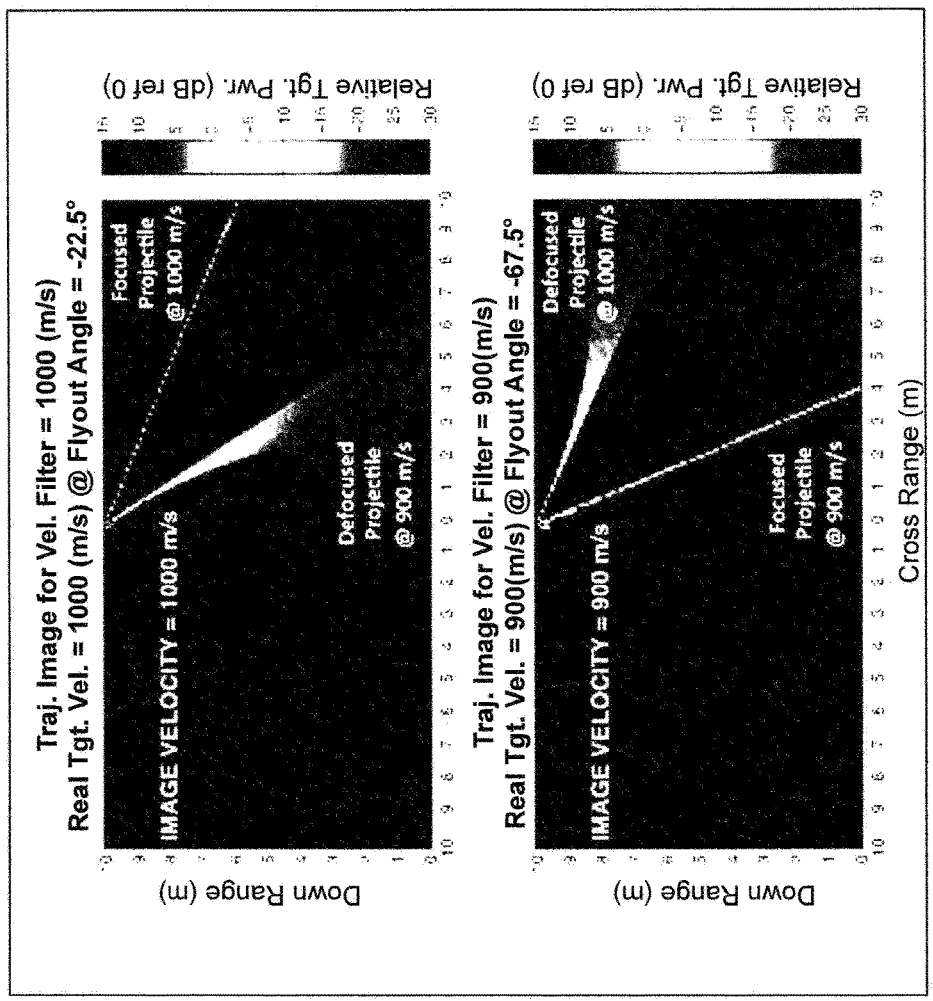

FIG. 8 shows the algorithm output for two different fragments at different speeds and directions. The matching filter image can be seen to show very well defined straight lines, and the unmatched fragment decorrelates and spreads its energy (more discernable in the image than denoted by the true amplitudes of the signals in the image).

Figure 9:
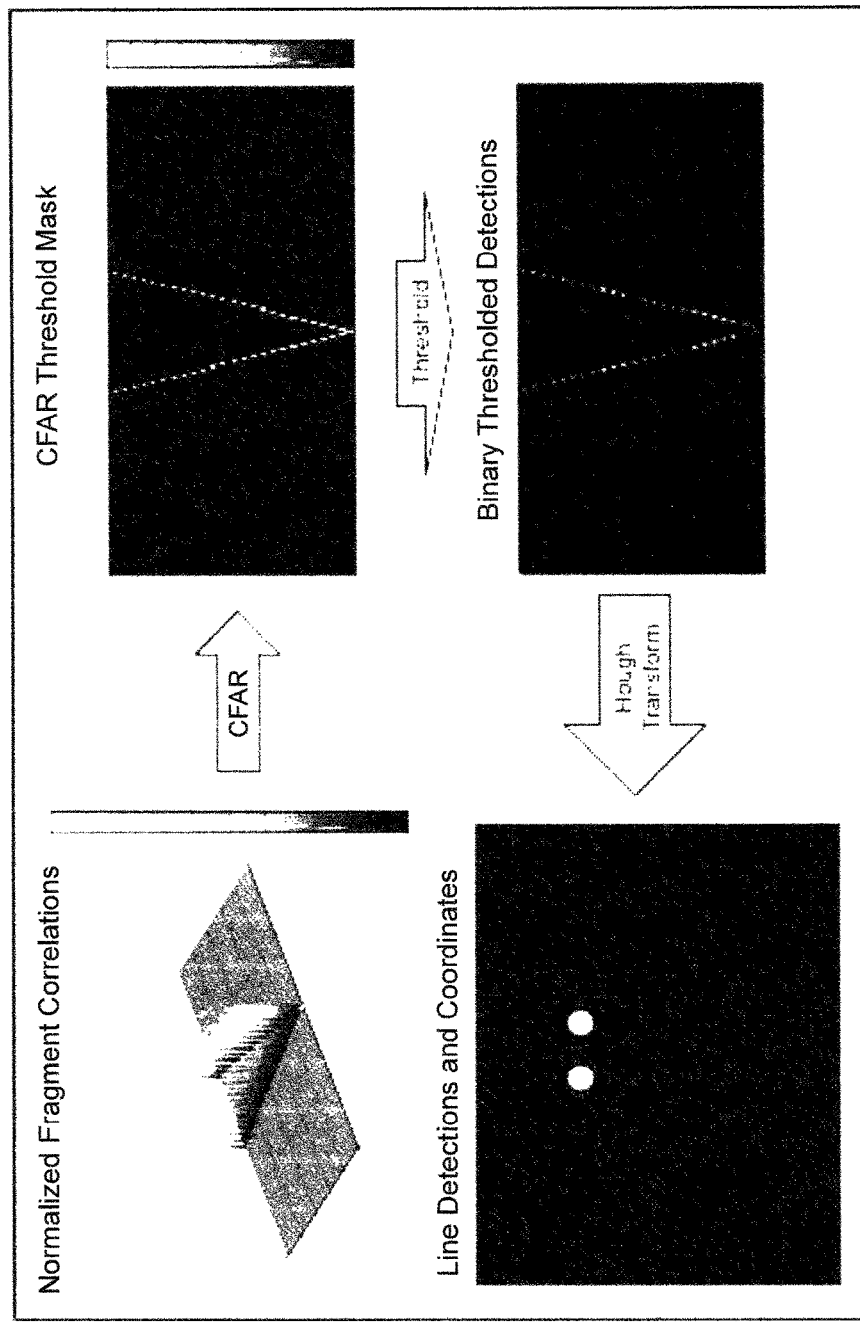

FIG. 9 shows an example of post processing of the image to extract the actual coordinates and line slope and y-intercept using the 2D Hough Transform. With this information on the lines, the ambiguity cone of the fragment has been determined. There is one of these cones for each receive antenna. Just like GPS, where they intersect is the actual physical trajectory of the fragment in 3D space. This can be determined by geometrically or trigometrically finding the intercept of the cones. Although 3 cones (hence 3 receivers) is the minimum number required to unambiguously find the unique fragment trajectory in 3D space, one should employ at least 4 sensors for when there might be a further ambiguity between the sensors (much like GPS needs 4 satellites to provide a reliable position all the time).

Figure 10:
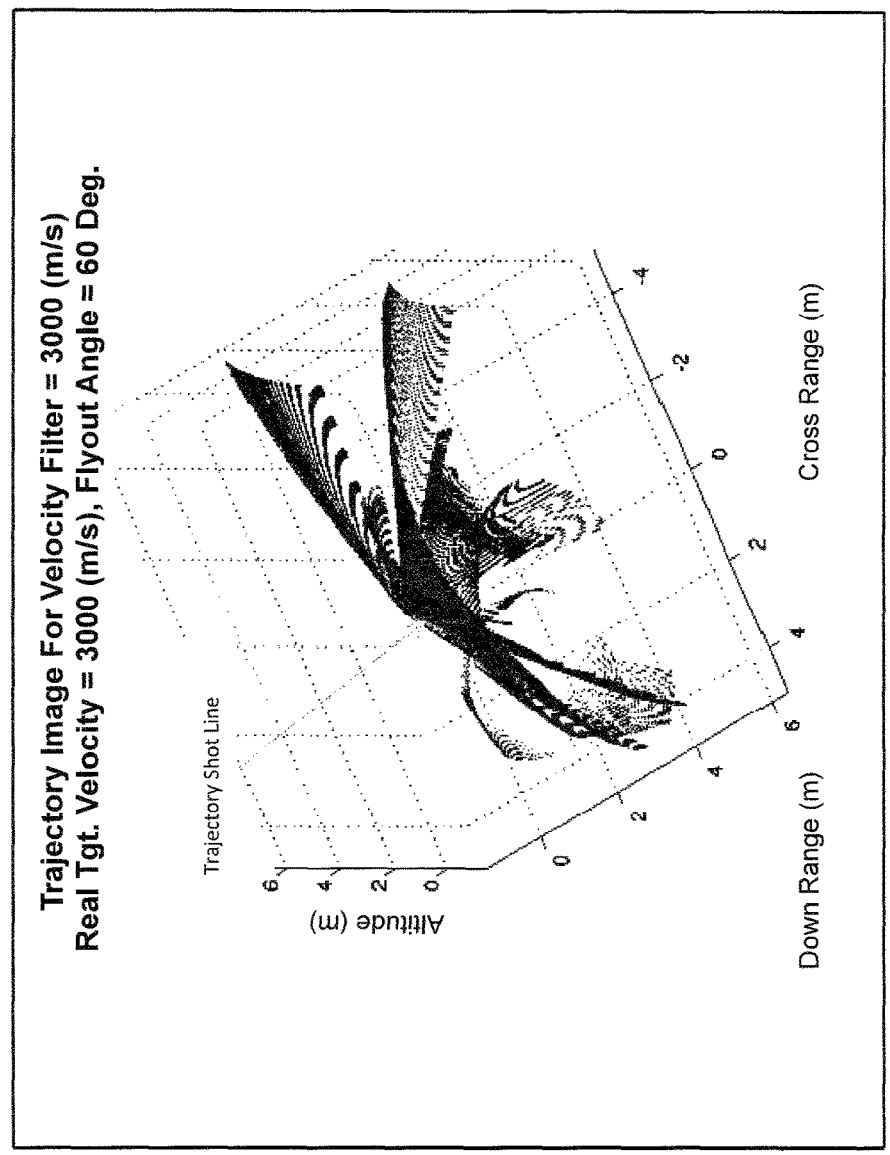

FIG. 10 shows a 3D imaging embodiment with essentially the same algorithm but imaging in 3D instead of just 2D. 4 cones can be seen for the 4 sensors employed. Where the cones intersect is the actual real space trajectory of the fragment. This approach suffers from needing more voxel resolution because of the additional degree of freedom which can further defocus the correlation unless the voxel lines right up on the position needed of ideal correlation. Due to the sensitivity of this technique, the output of the correlation is sensitive to the position of the voxel. To mitigate this one should either process each sensor's data in its own 2D image plane and then combine the resultant line parameters of the found lines in a geometric post processing routine to associate the right lines and combine the results for 3D imaging, or else one should defer to only processing the voxels on the surface of the 3D volume under the assumption that the fragments are traveling quite linearly and with relatively little drag slow down. A final way to improve the results is to cast the voxels and the Doppler Filter Banks along spherically symmetric radials emanating from the impact source, essentially making a spherically symmetric grid of voxels instead of a linearly cubic grid of voxels. Then any fragment traveling radially outward from the origin will quite accurately travers the pixels on a radial, meaning that the correlation output along that radial will always be very good.

REFERENCES

1. "Testing and Data Reduction Procedures for High-Explosive Munitions," Joint Munitions Effectiveness Manual (JMEM), USAF 61A1-3-7, Revision 2, 8 May 1990
2. Kinefuchi, et. al., IEEE Transactions on Antennas and Propagation, Vol. 58, no. 10, October 2010
3. Pham, A., et. al., "A W-Band 8×8 series fed patch array detector on Liquid Crystal Polymer", Antennas and Propagation Society International Symposium (APSURSI), 2012 IEEE
4. Guthrie, M. J., "Multiple Wavelength Scattering Techniques for Particle Size Distribution and Metallic Fragment Characterization," BAE SYSTEMS Analytical Solutions, Inc., Technical Report, 30 Dec. 2006

The invention claimed is:

1. A Doppler radar based interferometric imaging method for generating multiple images of high velocity fragments from an explosive or collision event, said method comprising:
   directing a continuous wave Doppler radar transmission signal comprising time synchronization signals from a transmission antenna into a test arena;
   using an array of at least 3 receiving antennas, receive continuous wave Doppler radar signal returns from said test arena;
   providing a digital down converted quadrature receiver for each receiving antenna, each quadrature receiver synchronized by said time synchronization signals,
   when said explosive or collision event occurs, using each antenna of said array to synchronously sample said continuous wave Doppler signal returns from high speed debris fragments within the test arena at a rate sufficient to record the velocities of said high speed debris fragments,
   using a high speed data recorder, recording data streams from each said quadrature receiver,
   using phase dependent signal compression and interferometric imaging to resolve ranges and angles of said high speed debris fragments, and
   imaging the trajectories of said high speed debris fragments in the test arena.

2. The method of claim 1, wherein the continuous wave Doppler radar transmission signal and the continuous wave Doppler signal returns are synchronous and phase coherent.

3. The method of claim 1, wherein the continuous wave Doppler radar transmission signal has a frequency of at least about 10 GHz.

4. The method of claim 1, wherein the region where the test arena has a volume of from about 240 $m^3$ to about 15.65 $m^3$.

5. The method of claim 1, wherein the array of receiving antennas is disposed at least two dimensionally and the transmission antenna is positioned within the at least two dimensions of the array.

6. The method of claim 1, wherein said multiple images of high velocity fragments comprises a set of three-dimensional Doppler images of fragment trajectories.

7. The method of claim 1, and further comprising combining a measured radar cross section and the rate of velocity slow down due to drag to estimate the mass of a fragment.

8. The method of claim 1, comprising directing a continuous wave Doppler radar transmission signal comprising time synchronization signals from an array of transmission antennas and wherein each of the array of transmission antennas is functionally coupled to one of the receiving antennas in said array of receiving antennas.

9. A radio frequency sensor system for detecting, tracking, and discriminating high velocity debris in an explosive or high velocity impact fire ball, said sensor system comprising:
   a continuous wave radar transmitter; an array of at least three receiver antennas disposed in both horizontal and vertical directions; a high speed data recorder; a display; and a computer, wherein:
   the continuous wave radar transmitter is configured to direct a continuous wave Doppler radar transmission signal comprising time synchronization signals from a transmission antenna into a test arena;
   the array of at least 3 receiving antennas is configured to receive continuous wave Doppler radar signal returns from said test arena;
   each receiving antenna comprises a digital down converted quadrature receiver synchronized by said time synchronization signals;
   each receiving antenna of said array is configured to synchronously sample continuous wave Doppler signal returns from high speed debris fragments within the test arena at a rate sufficient to record the velocities of said high speed debris fragments;
   said high speed data recorder is configured to record data streams from each said quadrature receiver;
   said computer comprises software to use phase dependent signal compression and interferometric imaging to resolve ranges and angles of said high speed debris fragments, and display the trajectories of said high speed debris fragments in the test arena on the display.

* * * * *

UNITED STATES PATENT AND TRADEMARK OFFICE
CERTIFICATE OF CORRECTION

PATENT NO. : 10,168,420 B1
APPLICATION NO. : 14/800669
DATED : January 1, 2019
INVENTOR(S) : Herbert U. Fluhler and Michael J. Guthrie It is certified that error appears in the above-identified patent and that said Letters Patent is hereby corrected as shown below:

In the Specification

Column 1 Lines 15-21 under the heading "STATEMENT REGARDING FEDERALLY FUNDED DEVELOPMENT," the paragraph reading:
"Adaptation and application to specific defense related uses was made with government assistance from the Missile Defense Agency under Small Business Innovation Research (SBIR) Topic MDA14-008: "Mapping Debris Trajectories Through a Fireball." Contract Number: HQ0147-15-C-7127. The government has SBIR Data Rights in the invention."

Is replaced by the following corrected paragraph:
"This invention was made with Government support under HQ0147-15-C-7127 awarded by Missile Defense Agency. The Government has certain rights in the invention."

Signed and Sealed this
Ninth Day of April, 2019

Andrei Iancu
*Director of the United States Patent and Trademark Office*